(12) United States Patent
Lee et al.

(10) Patent No.: US 9,420,919 B2
(45) Date of Patent: Aug. 23, 2016

(54) HANDHELD GRATER WITH CATCH BIN

(71) Applicant: Robinson Home Products Inc., Williamsville, NY (US)

(72) Inventors: Stuart Harvey Lee, Forest Hills, NY (US); Jochen Schaepers, New York, NY (US)

(73) Assignee: Robinson Home Products Inc., Williamsville, NY (US)

( * ) Notice: Subject to any disclaimer, the term of this patent is extended or adjusted under 35 U.S.C. 154(b) by 376 days.

(21) Appl. No.: 14/188,520

(22) Filed: Feb. 24, 2014

(65) Prior Publication Data

US 2014/0246528 A1    Sep. 4, 2014

Related U.S. Application Data

(60) Provisional application No. 61/771,763, filed on Mar. 1, 2013.

(51) Int. Cl.
*A47J 43/25* (2006.01)

(52) U.S. Cl.
CPC ........................ *A47J 43/25* (2013.01)

(58) Field of Classification Search
CPC ....................................................... A47J 43/25
USPC ............................ 241/100, 95, 273.1–273.4
See application file for complete search history.

(56) References Cited

U.S. PATENT DOCUMENTS

| | | | |
|---|---|---|---|
| D259,759 S | 7/1981 | Williams | |
| 4,531,437 A * | 7/1985 | Szablak | A61M 5/3278 241/100 |
| 5,312,054 A | 5/1994 | Feer et al. | |
| D389,019 S | 1/1998 | Molo | |
| D448,256 S | 9/2001 | Ancona et al. | |
| D472,110 S | 3/2003 | Wright | |
| D548,549 S | 8/2007 | Curtin | |
| D568,118 S | 5/2008 | Chalfant et al. | |
| 7,469,848 B2 | 12/2008 | Yamanaka et al. | |
| D593,817 S | 6/2009 | Eide et al. | |
| 2004/0217219 A1 | 11/2004 | Bitonto et al. | |
| 2005/0006505 A1 | 1/2005 | McNeeley et al. | |
| 2006/0283994 A1 | 12/2006 | Webb et al. | |

* cited by examiner

*Primary Examiner* — Mark Rosenbaum
(74) *Attorney, Agent, or Firm* — Florek & Endres PLLC

(57) ABSTRACT

A handheld having a grater panel with a bottom surface from which grated particulates emerge and a catch bin removably attached to the grater panel, the catch bin having a substantially flexible body with one or more living hinges capable of adapting the catch bin from a collapsed configuration for storage to an expanded configuration for use. The catch bin has an open top for receiving the grated particulates and may also include an open front corresponding to the handle end of the grater panel from which the grated particulates can be poured.

16 Claims, 7 Drawing Sheets

HANDHELD GRATER WITH CATCH BIN

FIELD OF THE INVENTION

The present invention relates to kitchen accessories, and more particularly to a grater for grating and/or slicing food items.

BACKGROUND OF THE INVENTION

Graters are well known in the art to come in a variety of configurations. For example, flat handheld graters generally have a single grating surface on a single panel, where the grated particulates drop from the back of the grater, as shown in U.S. Pat. No. D448,256. The user can therefore direct the grated particulates from the back of the grating panel into a storage container or onto a food item. However, open handheld graters provide limited control of errant grated particulates (referred to herein to include grated particulates of different coarseness, including slices of any thickness).

To better control the grated particulates, some graters have been adapted to include an integrated container or the like to catch the grated particulates rather than merely allowing the grated particulates to fall into an independent storage container or onto a food item. For example, U.S. Pat. Nos. D389,019 and 5,312,054 describe collection containers attached to the back surface of the panel having a grating surface.

There have also been efforts to reduce the size of graters. For example, U.S. Pat. Nos. 5,312,054 and D548,549 describe multi-sided graters formed of two panels in an inverted "V" where the two panels are pivotally attached at the top and fold together to reduce the overall volume. U.S. Patent Application Publication No. 2005/0006505 describes a three sided grater having a center panel connected to right and left panels by hinges, where the right and left panels can be snapped together or held in adjacent relation by a cap which can be fixed to the top of each of the panels. Unsnapping the right and left panels or removing the cap permits the three sided grater to be folded into a flat configuration. However, graters still require improvement in providing control of grated particulates and a reduced size.

SUMMARY OF THE INVENTION

The present invention is directed to a handheld grater comprising:
a grater panel having a top surface with a grater implement incorporated thereon, a bottom surface from which grated particulates are designed to emerge, a first end and a second end;
a handle coupled to the first end of the grater panel; and
a catch bin removably attached to the grater panel;
wherein the catch bin comprises a substantially flexible body, said body having one or more living hinges for collapsing the bin when not in use.

The grater panel is preferably formed of a plastic material, with a grater insert formed of a metal component for properly grating or cutting food items passing thereover. In the preferred embodiment, an elastomeric material is formed on at least a portion of the handle, for user comfort.

It is also preferred that the grater have feet, preferably located at or near the second end of the grater panel, preferably closer to the bottom of the panel than the top. This permits the user to hold the handle at the first end and rest the feet at the second end on a surface, such as a countertop or table, orienting the grater panel at an angle to the surface, for stability of the grater during use. For additional stability, the feet preferably comprise an elastomeric material to prevent slippage of the grater on the surface when in use.

In the preferred embodiment the catch bin fits on the bottom of the grater panel, covering the entire bottom from which grated particulates are designed to emerge. Any mechanism capable of removably holding the bin to the grater panel may be used, especially if it can be easily removed without spilling the contents when full of grated particulates. Notwithstanding, cooperating members are most preferred, including but not limited to rails, clips, snaps, magnets, clasps, hooks, catches, or the like, formed of materials that can be used in a food environment.

The catch bin preferably includes a substantially rigid rim which may be formed of any substantially rigid material, with plastic being preferred and acrylonitrile butadiene styrene (ABS) being most preferred. Similarly, the flexible material coupled to the rim may be any suitable flexible material, with a thermoplastic elastomeric material being preferred. In this regard, the use of a thermoplastic elastomeric material for the flexible material of the bin can easily be fashioned into the living hinges for collapsing the bin.

Although the catch bin can be connected to any part of the grater panel, including over the edges of the top surface, along the sides or on the bottom, it is preferred that the catch bin attaches to the bottom of the grater panel by rails placed on the grater panel bottom. The catch bin, and preferably the rigid rim of the catch bin, would therefore include cooperating structure to engage the rails on the bottom of the grater panel.

In the most preferred embodiment, the rigid rim would only be placed around the sides and back of the upper edge of the catch bin, so that the ends of the rim near the front of the catch bin can be squeezed together to release the catch bin from the rails of the grater panel. Additionally, the preferred catch bin would have an open front, facing the first end of the grater panel, without the rigid rim and without the flexible material, so that the grated particulates can be spilled from the bin without removing the bin from the grater panel.

Of course, if the user does not wish to catch the grated particulate, for example when the grated particulate is to be grated directly onto a food item, the catch bin can be removed.

BRIEF DESCRIPTION OF THE DRAWINGS

The attached drawings are intended to better illustrate a preferred embodiment of the present invention without limiting the invention in any manner whatsoever.

FIG. 3 is an exploded view of the bin portion of the preferred embodiment of the grater of the present invention in.

DETAILED DESCRIPTION OF THE PREFERRED EMBODIMENTS

The following description of preferred embodiment is presented to describe the present invention and is not to be construed to limit the scope of the claims in any manner whatsoever.

Figure 3:
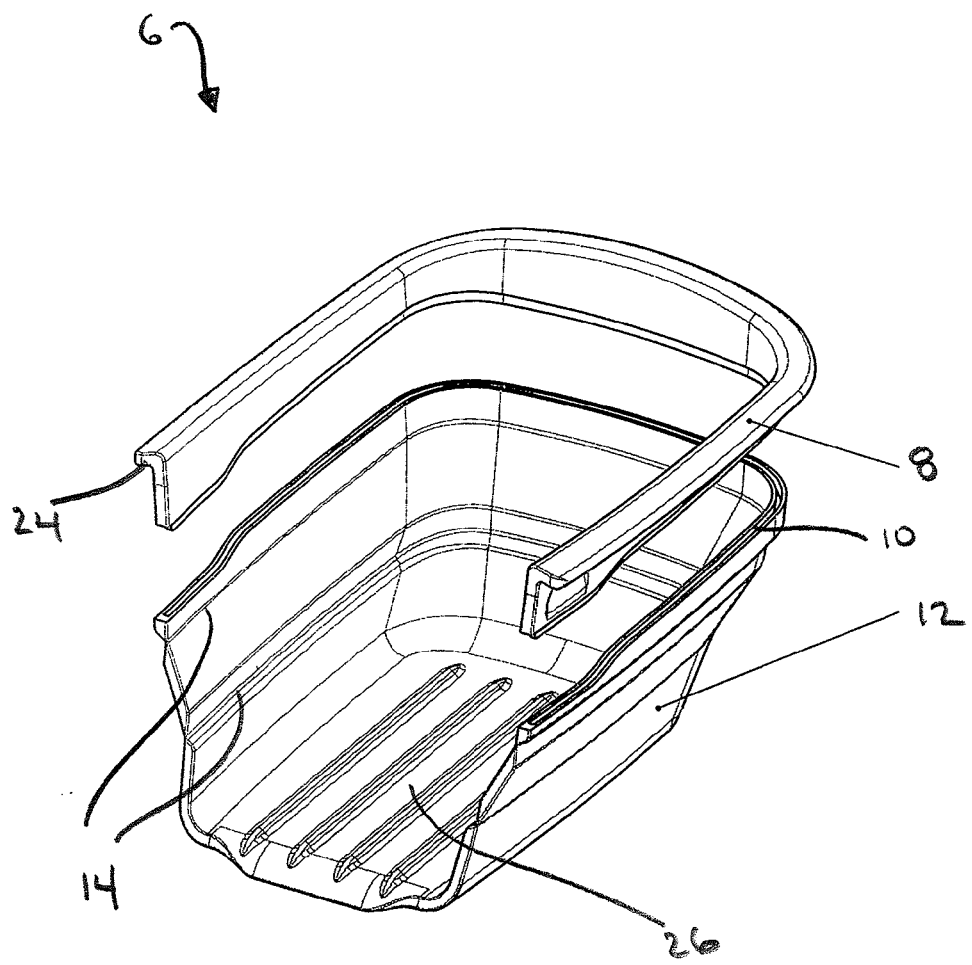

As best shown in the drawings, and especially FIGS. 1, 4, 5 and 6, the preferred embodiment of the present invention is directed to a grater 2 comprising a grater panel 4 and a catch bin 6 removably attachable to the grater panel 4. The preferred catch bin 6, shown in FIG. 3, comprises a substantially rigid rim 8 about at least a portion of an upper edge 10 of a substantially flexible body 12, said body 12 having one or more living hinges 14 for collapsing the bin 6 when not in use.

The grater panel 4 preferably includes a top surface with a grater implement 16 incorporated thereon, a bottom surface from which grated particulates are designed to emerge, a handle 18 associated with a first end and feet 20 associated with a second end.

Figure 1:
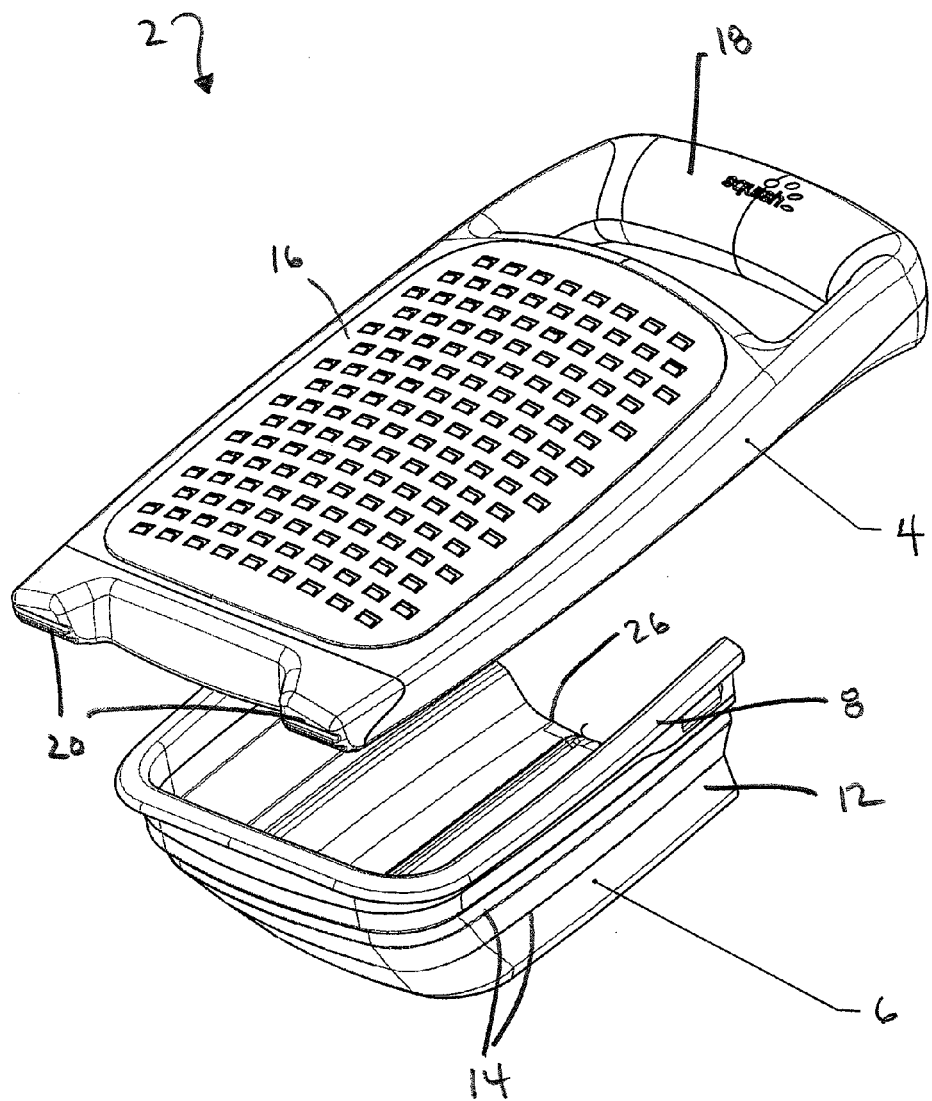
FIG. 1 is an exploded view of the preferred embodiment of the grater of the present invention.
Figure 2:
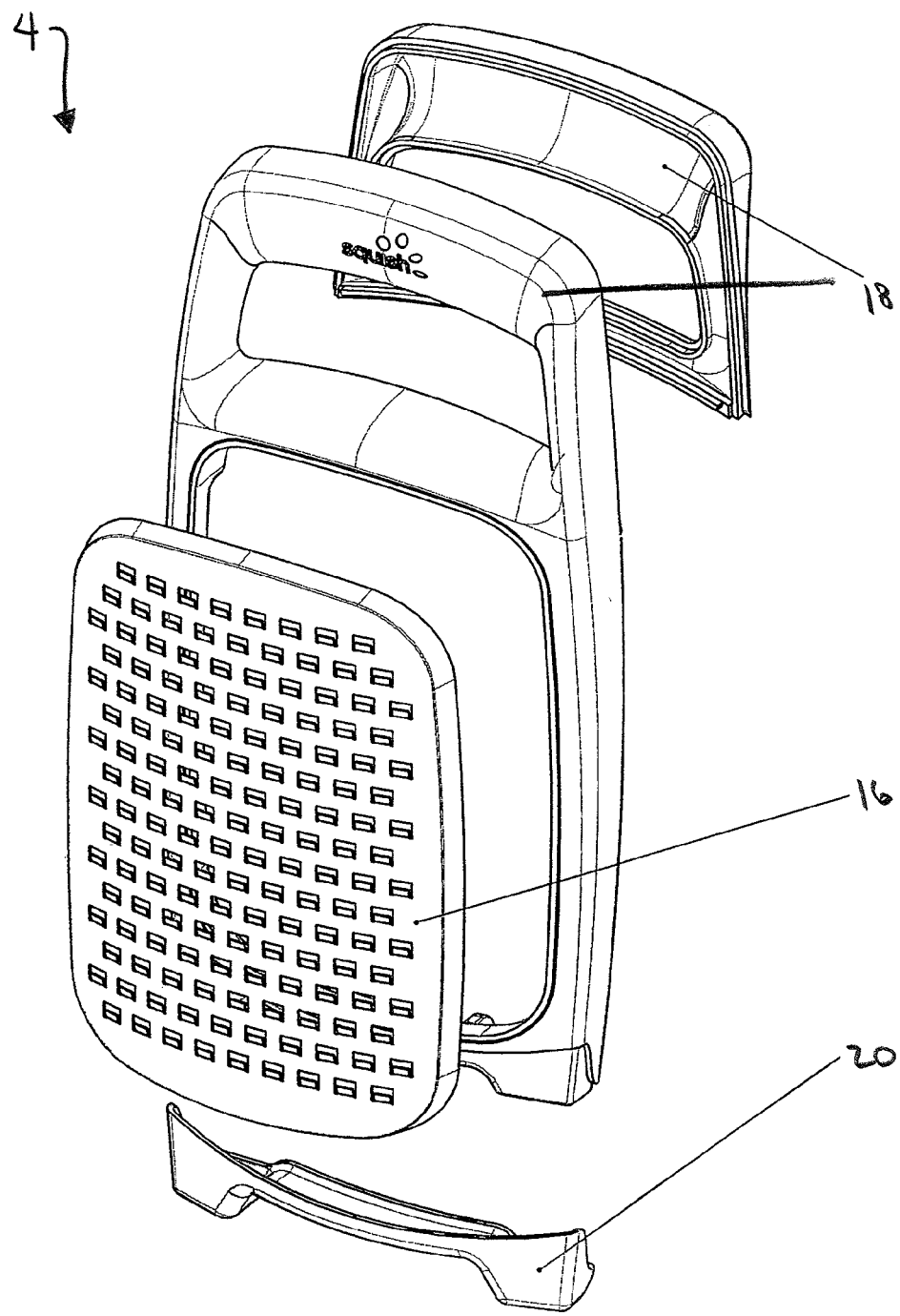
FIG. 2 is an exploded view of the grater panel portion of the preferred embodiment of the grater of the present invention.

The body of the grater panel 4, shown in FIG. 2, is preferably formed of a plastic material, with a grater implement 16 formed of a metal component for properly grating or cutting food items passing thereover. In the preferred embodiment, an elastomeric material is formed on at least a portion of the handle 18 for user comfort.

Figures 4, 5:
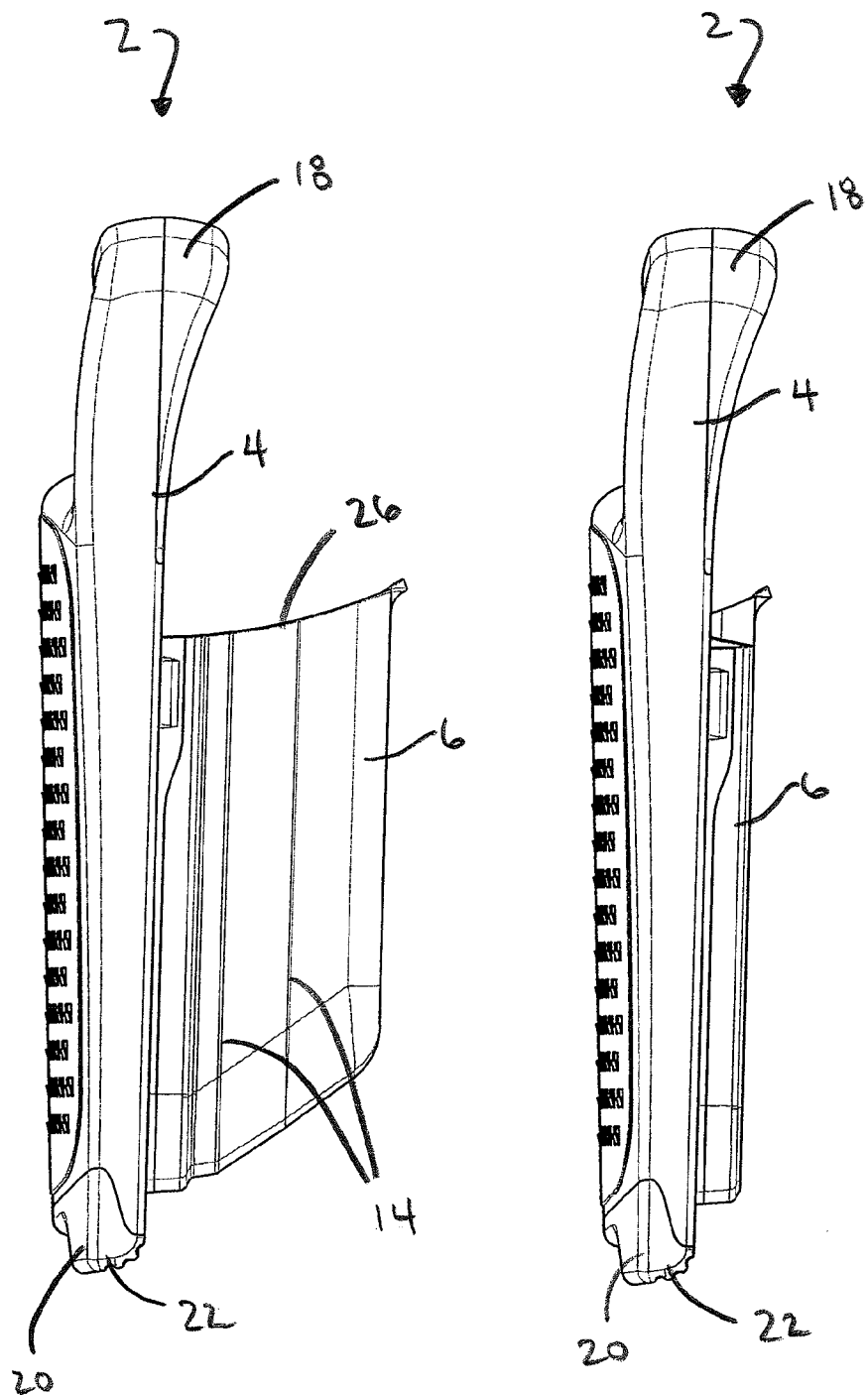
FIG. 4 is a side elevation of the preferred embodiment of the grater of the present invention with the bin in its open configuration.
FIG. 5 is a side elevation of the preferred embodiment of the grater of the present invention with the bin in its closed configuration.
Figure 6:
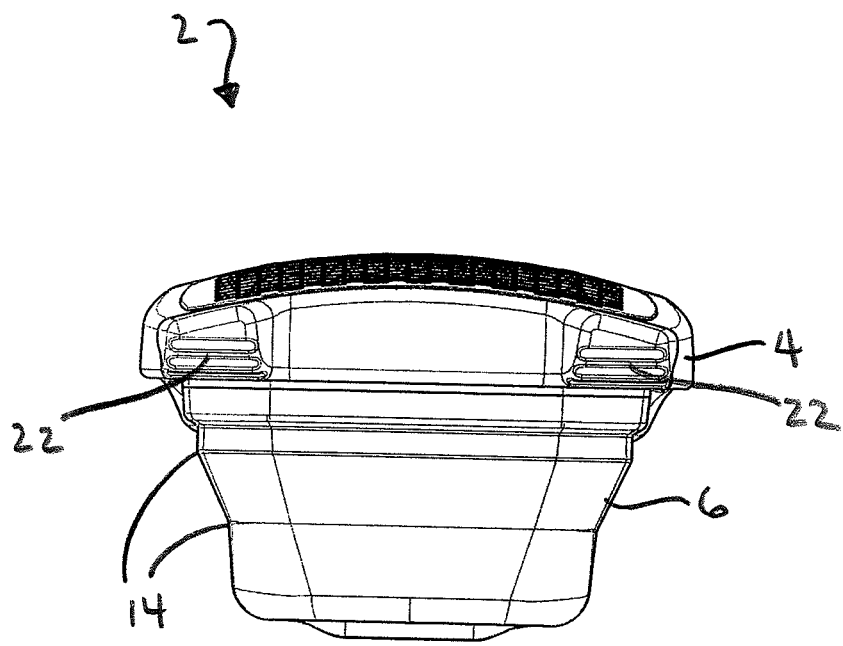
FIG. 6 is a front elevation of the preferred embodiment of the grater of the present invention with the bin in its open configuration.
Figure 7:
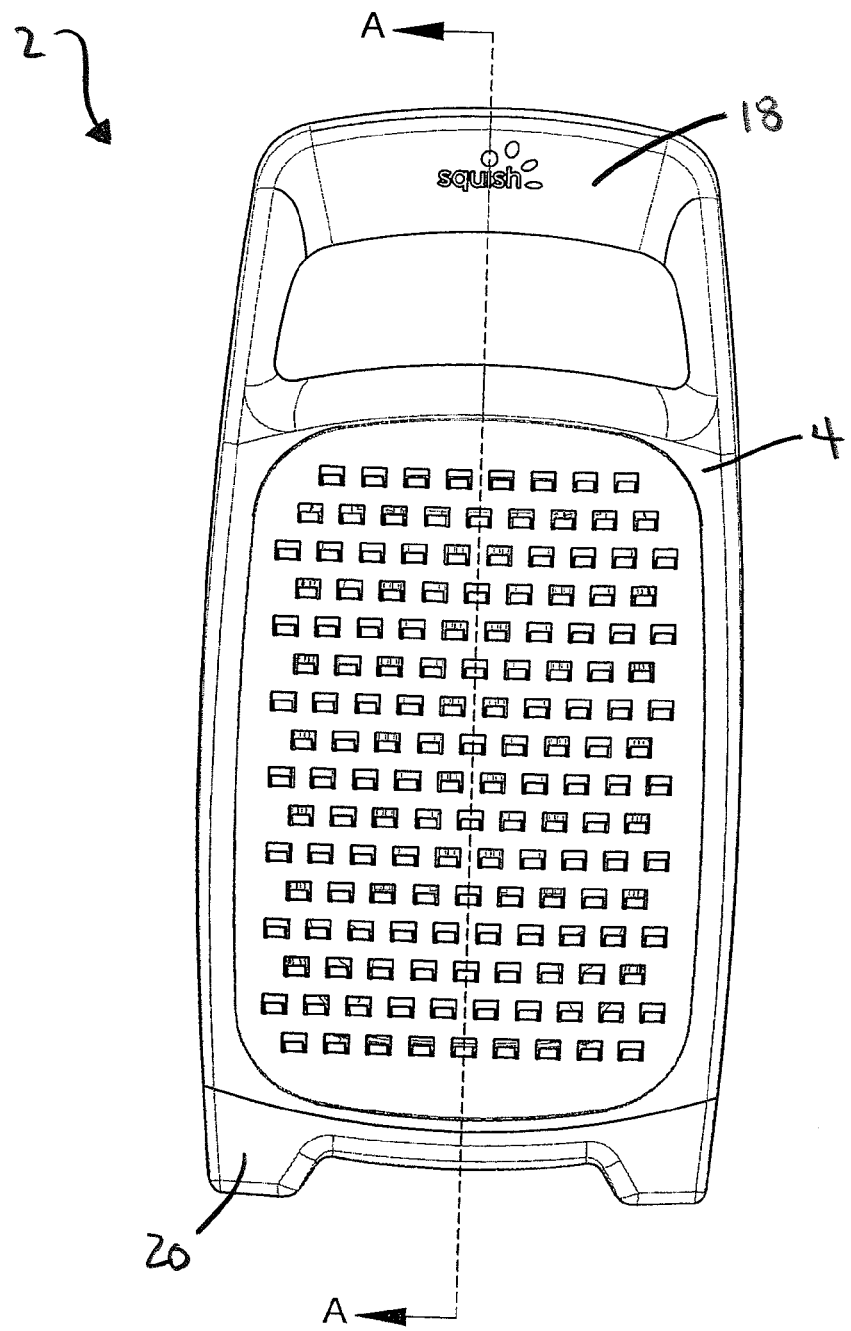
FIG. 7 is a top plan view of the preferred embodiment of the grater of the present invention.
Figure 8:
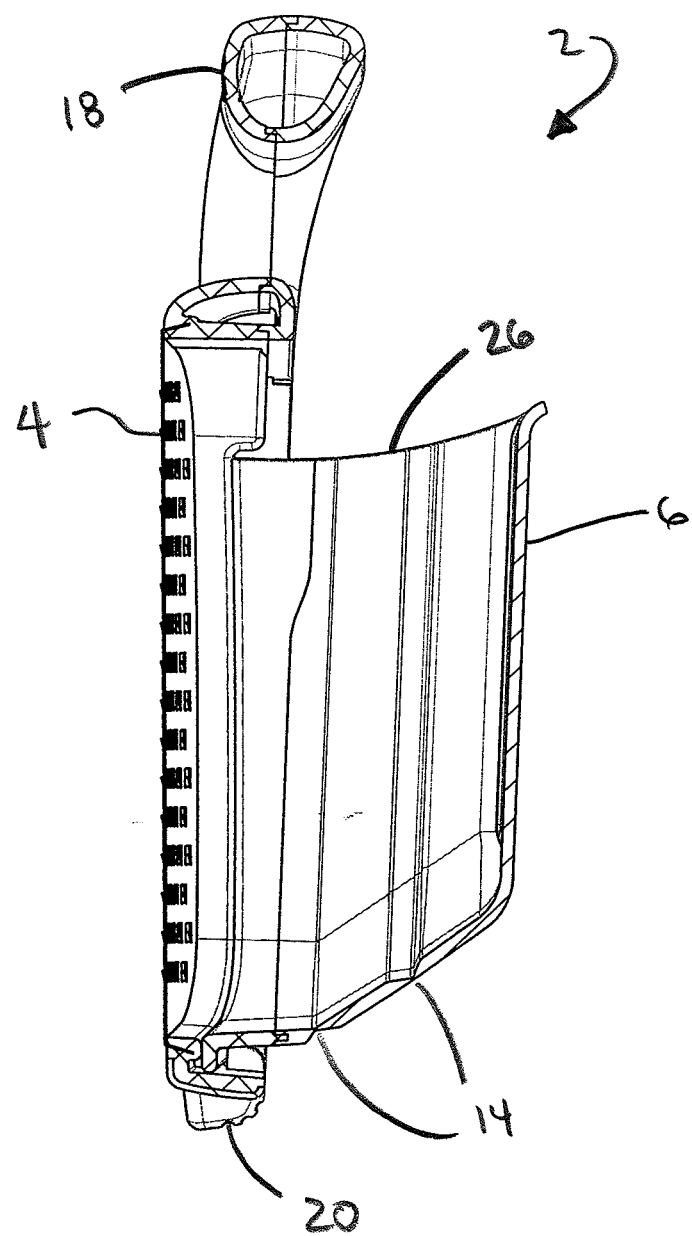
FIG. 8 is a side cross section of the preferred embodiment of the grater of the present invention with the bin in its open configuration, through line A-A of FIG. 7.

The preferred feet 20 associated with the second end of the grater panel 4 preferably comprise an elastomeric material to prevent slippage of the grater 2 on a work surface when in use. To create a user friendly angle for the grater 2 during use, the surface engaging portions 22 of the feet 20, best seen in FIGS. 4 5 and 6, are preferably located closer to the bottom of the grater panel 4 than the top and include an elastomeric material, at least as a coating on the bottom surface.

In the preferred embodiment shown in the drawings, the catch bin 6 fits on the bottom of the grater panel 4, covering virtually the entire bottom of the grater implement 16 from which grated particulates are designed to emerge. Although any mechanism capable of removably holding the bin 6 to the grater panel 4 may be used, cooperating members are most preferred, including but not limited to rails, clips, snaps, magnets, clasps, hooks, catches, or the like. These are preferably incorporated into the rim 8 of the bin 6 and the underside of the plastic portion of the grater panel 4.

Most preferably, the bin 6 can be removed from the grater panel 4 without spilling the contents when full of grated particulates.

The substantially rigid rim 8 of the catch bin 6 may be formed of any substantially rigid material, with plastic being preferred. Similarly, the catch bin body 12 coupled to the rim 8 may be formed of any suitable flexible material, with a thermoplastic elastomeric material being preferred. In this regard, the use of a thermoplastic elastomeric material for the body 12 of the bin 6 can easily be fashioned into the living hinges 14 for collapsing the bin 6.

Although the catch bin 6 can be connected to any part of the grater panel 4, including over the edges of the top surface, along the sides or on the bottom, it is preferred that the catch bin 6 attaches to the bottom of the grater panel 14. Most preferably, the attachment is by rails or clips placed on the bottom of the grater panel 4. The catch bin 6, and preferably the rigid rim 8 of the catch bin 6, would therefore include cooperating ledges 24 to engage the rails on the bottom of the grater panel 4 (see FIG. 3).

In the most preferred embodiment, the rigid rim 8 would only be placed around the sides and back of the upper edge 10 of the catch bin 6, so that the ends of the rim 8 near the front of the catch bin 6 can be squeezed together to release the catch bin 6 from the rails of the grater panel 4. Additionally, the preferred catch bin 6 would have an open front 26, facing the first end of the grater panel 4, without the rigid rim 8 and without that portion of the body 6, so that the grated particulates can be spilled from the bin 6 without removing the bin 6 from the grater panel 14.

Variations, modifications and alterations to the above detailed description will be apparent to those skilled in the art. All such variations, modifications and/or alternatives are intended to fall within the scope of the present invention, limited only by the appended claims. All cited patents and publications are hereby incorporated by reference.

We claim:

1. A handheld grater comprising:
a grater panel having a top surface with a grater implement incorporated thereon, a bottom surface from which grated particulates are designed to emerge, a first end and a second end;
a handle coupled to the first end of the grater panel; and
a catch bin removably attached to the grater panel;
wherein the catch bin comprises a substantially flexible body, said body having one or more living hinges capable of adapting the catch bin from a collapsed configuration for storage to an expanded configuration for use.

2. The handheld grater of claim 1 wherein the catch bin covers the entire bottom of the grater panel from which grated particulates are designed to emerge.

3. The handheld grater of claim 1 wherein the grater panel further comprises a top surface and side surfaces and the catch bin is attached to one or more of the bottom, top or side surfaces of the grater panel.

4. The handheld grater of claim 1 wherein the catch bin is attached to the bottom surface of the grater panel.

5. The handheld grater of claim 1 wherein the catch bin is attached to the grater panel by one or more cooperating removable attachment members taken from the group consisting of rails, clips, snaps, magnets, clasps, hooks, catches and combinations thereof, with a first cooperating removable attachment member associated with the grater panel and a second cooperating removable attachment member associated with the catch bin.

6. The handheld grater of claim 1 wherein the catch bin comprises a rigid rim about at least a portion of the top of the catch bin formed of a substantially rigid material and a flexible body formed of a substantially flexible material.

7. The handheld grater of claim 6 wherein the substantially flexible material is a thermoplastic elastomeric material having one or more living hinges for collapsing the catch bin.

8. The handheld grater of claim 6 wherein the substantially flexible material has two living hinges for collapsing the catch bin.

9. The handheld grater of claim 1 wherein the handle is formed at least in part of a thermoplastic elastomeric material.

10. The handheld grater of claim 1 wherein the grater panel further comprises one or more feet corresponding to the second end of the grater panel.

11. The handheld grater of claim 10 wherein the feet are formed at least in part of an elastomeric material.

12. The handheld grater of claim 1 wherein the catch bin comprises a closed back corresponding to the first end of the grater panel, a closed bottom, a closed left side and a closed right side.

13. The handheld grater of claim 12 wherein the catch bin comprises an open top for receiving grated particulates from the grater panel and an open front corresponding to the first end of the grater panel.

14. The handheld grater of claim 6 wherein the rigid rim has an open front corresponding to the first end of the grater panel.

15. The handheld grater of claim 1 wherein the catch bin comprises an open top for receiving grated particulates from the grater panel and an open front corresponding to the first end of the grater panel.

16. The handheld grater of claim 1 wherein the grater panel comprises an outer edge formed of a plastic material and a grater insert formed of a metal component with grater elements for grating or cutting food items passed over the grater elements.

* * * * *